(12) United States Patent
Kim (10) Patent No.: US 9,126,247 B2
(45) Date of Patent: Sep. 8, 2015

(54) OUTER PANEL FOR PILLAR OF VEHICLE, AND METHOD AND ROLLING APPARATUS FOR MANUFACTURING THE SAME

(71) Applicant: Hyundai Motor Company, Seoul (KR)

(72) Inventor: Do Hoi Kim, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/100,642

(22) Filed: Dec. 9, 2013

(65) Prior Publication Data

US 2015/0091327 A1    Apr. 2, 2015

(30) Foreign Application Priority Data

Sep. 30, 2013  (KR) .................. 10-2013-0115818

(51) Int. Cl.
| | |
|---|---|
| *B60J 7/00* | (2006.01) |
| *B21B 1/12* | (2006.01) |
| *B21B 15/00* | (2006.01) |
| *B62D 25/04* | (2006.01) |

(52) U.S. Cl.
CPC ............... *B21B 1/12* (2013.01); *B21B 15/0007* (2013.01); *B62D 25/04* (2013.01)

(58) Field of Classification Search
CPC ...... A45C 5/14; A45C 13/103; A45C 13/262; A45C 2013/267; A45C 3/001; F16B 37/068; B21D 39/021; B23P 19/062; B28B 3/12; B30B 3/04
USPC ................. 296/187.03, 136.02, 146.6, 146.9, 296/187.12, 203.03, 30
See application file for complete search history.

(56) References Cited

U.S. PATENT DOCUMENTS

| | | | | |
|---|---|---|---|---|
| 4,252,364 A * | 2/1981 | Toyama et al. | .......... | 296/203.01 |
| 5,277,469 A * | 1/1994 | Klippel | .................... | 296/146.6 |
| 5,810,428 A * | 9/1998 | Maki | ........................ | 296/203.02 |
| 5,941,597 A * | 8/1999 | Horiuchi et al. | ........ | 296/203.01 |
| 6,199,941 B1 * | 3/2001 | Takahara et al. | ......... | 296/187.05 |
| 6,217,109 B1 * | 4/2001 | Okana et al. | ............. | 296/203.03 |
| 6,267,436 B1 * | 7/2001 | Takahara | ................. | 296/187.05 |
| 6,322,135 B1 * | 11/2001 | Okana et al. | ............. | 296/203.03 |
| 6,474,726 B1 * | 11/2002 | Hanakawa et al. | .......... | 296/191 |
| 6,702,368 B1 * | 3/2004 | Hanyu | .................... | 296/193.06 |
| 8,491,047 B1 * | 7/2013 | Moll | ........................ | 296/193.06 |
| 8,511,746 B2 * | 8/2013 | Kawamura et al. | ........... | 296/205 |
| 2002/0033618 A1 * | 3/2002 | Kwon | ....................... | 296/203.03 |
| 2003/0146649 A1 * | 8/2003 | Kim | ................................. | 296/202 |
| 2008/0143144 A1 * | 6/2008 | Yustick et al. | ............ | 296/187.03 |
| 2009/0146457 A1 * | 6/2009 | Kanagai et al. | .......... | 296/187.12 |
| 2010/0133877 A1 * | 6/2010 | Mori | ........................ | 296/187.12 |
| 2011/0210581 A1 * | 9/2011 | Kunishi et al. | ........... | 296/193.01 |

(Continued)

FOREIGN PATENT DOCUMENTS

| | | |
|---|---|---|
| JP | 2000-142465 A | 5/2000 |
| JP | 2008-68759 A | 3/2008 |

(Continued)

*Primary Examiner* — Kiran B Patel
(74) *Attorney, Agent, or Firm* — Morgan, Lewis & Bockius LLP (57) ABSTRACT

An outer panel for a pillar of a vehicle includes a central portion, flanges at opposite sides thereof for bonding to an inner panel, and opposite side portions between the central portion and the flange portions in a transverse sectional shape, wherein each of the side portions located at opposite sides of the central portion has a collision energy absorbing section having a thickness that is smaller than that of the central portion.

5 Claims, 10 Drawing Sheets

(56) References Cited

U.S. PATENT DOCUMENTS

| | | | |
|---|---|---|---|
| 2012/0256445 A1* | 10/2012 | Baccouche et al. | 296/193.06 |
| 2013/0187406 A1* | 7/2013 | Torii | 296/187.12 |
| 2013/0200650 A1* | 8/2013 | Matsuoka et al. | 296/187.1 |
| 2013/0249250 A1* | 9/2013 | Ohhama et al. | 296/204 |
| 2013/0257098 A1* | 10/2013 | Matsuda et al. | 296/187.12 |
| 2014/0145468 A1* | 5/2014 | Takizawa | 296/187.12 |
| 2014/0284967 A1* | 9/2014 | Torii | 296/193.06 |
| 2014/0333093 A1* | 11/2014 | Matsuura et al. | 296/187.12 |

FOREIGN PATENT DOCUMENTS

| | | |
|---|---|---|
| JP | 2011-161941 A | 8/2011 |
| KR | 10-2009-0024880 A | 3/2009 |
| KR | 10-2009-0123011 A | 12/2009 |
| KR | 10-2010-0087472 A | 8/2010 |
| WO | WO 2007/019979 A1 | 2/2007 |
| WO | WO 2008/139329 A2 | 11/2008 |
| WO | WO 2009/119654 A1 | 10/2009 |
| WO | WO 2012/126697 A1 | 9/2012 |

* cited by examiner

FIG. 1

Longitudinal direction (lengthwise direction/heigthwise direction) of panel
Transverse direction (widthwise direction) of panel

OUTER PANEL FOR PILLAR OF VEHICLE, AND METHOD AND ROLLING APPARATUS FOR MANUFACTURING THE SAME

CROSS-REFERENCE TO RELATED APPLICATION

The present application claims priority of Korean Patent Application Number 10-2013-0115818 filed Sep. 30, 2013, the entire contents of which application is incorporated herein for all purposes by this reference.

BACKGROUND OF INVENTION

1. Field of Invention

The present invention relates to an outer panel for a pillar of a vehicle, and an apparatus and a method for manufacturing the same. More particularly, it relates to an outer panel for a center pillar which can enhance energy absorption efficiency during collision, and a rolling apparatus and a rolling method for manufacturing the same.

2. Description of Related Art

In general, a shape of a vehicle is formed by assembling pressed panels such that the pressed panels correspond to various parts of a vehicle body frame, and a center pillar of the vehicle also is formed by assembling a plurality of panels.

A general center pillar is formed by assembling an outer panel and an inner panel, and a space between the outer panel and the inner panel has a closed cross-section. A reinforcing panel is installed in the space or a filling material for preventing introduction or transfer of noise is filled.

Figure 1:
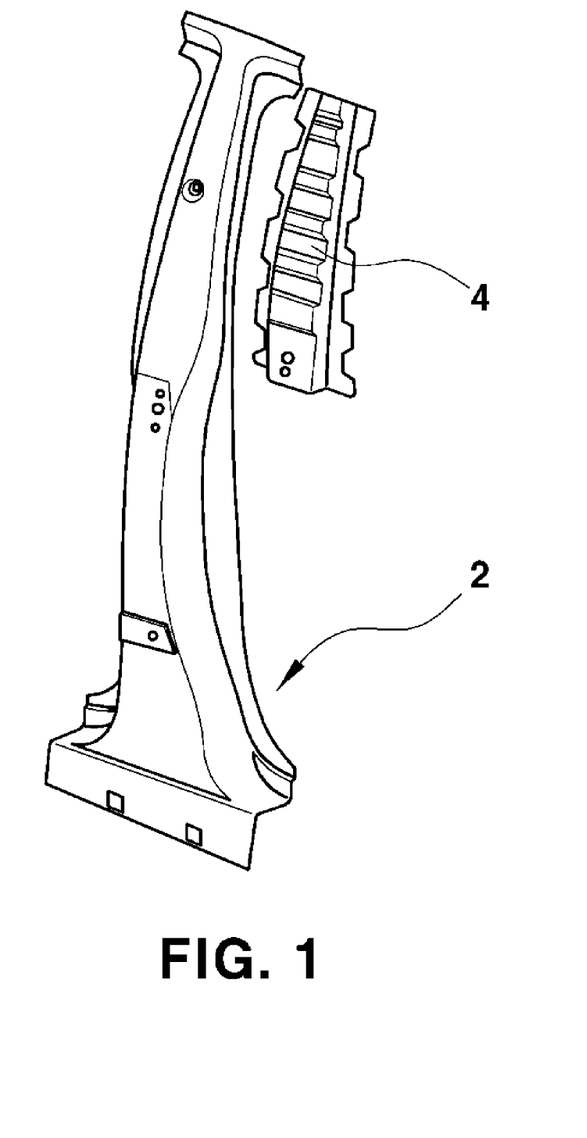
FIGS. 1 and 2 are perspective views showing an outer panel of a center pillar.
Figure 2:
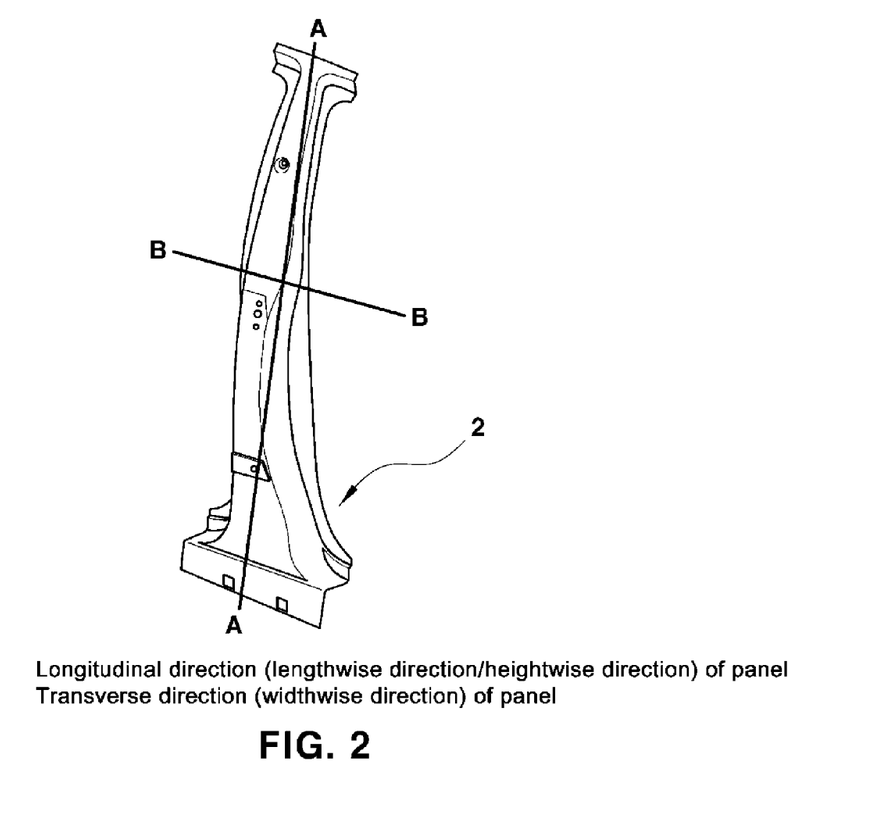

FIGS. 1 and 2 are views showing an outer panel of a center pillar. FIG. 1 shows an outer panel 2 manufactured through a hot stamping method, and FIG. 2 shows an outer panel 2 manufactured by applying a TRB method.

According to the related art, a center pillar outer panel 2 is manufactured through a hot stamping method to reduce weight while improving strength, and a reinforcing panel is installed inside the outer panel to reinforce strength.

However, since a panel manufactured through a hot stamping method has too high a strength, a deformation of the pillar becomes excessive due to a fracture during a side collision. Thus, a technology of manufacturing a panel by applying a tailor rolled blank (TRB) method is known.

The TRB is a rolling technology for producing materials with difference in thickness by changing a gap between rollers during rolling. Since the TRB allows a high strength and a light weight at a part of a product, reduces the number of production processes, and improves structural strength, it is widely used in producing vehicle body parts having different thicknesses.

When the TRB technology is applied to manufacturing of a panel, a panel (outer panel) can be manufactured with a plurality of sections having different thicknesses along a lengthwise direction (a longitudinal direction, that is, a heightwise direction with respect to the vehicle body).

When the variable longitudinal thickness shape is applied, a thickness of a portion requiring a high strength can be relatively large. Thus, an existing reinforcing panel can be deleted and light weight can be achieved as the reinforcing panel is deleted.

A prior technical document applying the TRB technology in manufacturing a vehicle body panel includes Korean Patent Application Publication No. 10-2009-0024880 (published on Mar. 10, 2009). A technology of overlapping two steel plates between a work roll at an upper end of a rolling machine and a work roll at a lower end thereof is well known in the prior document, but one panel is generally TRB rolled to manufacture a panel having a variable thickness structure.

International Publication No. WO 2012/126697 discloses a technology of manufacturing a panel for a center pillar having a thickness difference with respect to a longitudinal cross-sectional thereof by applying the TRB technology.

Figure 3:
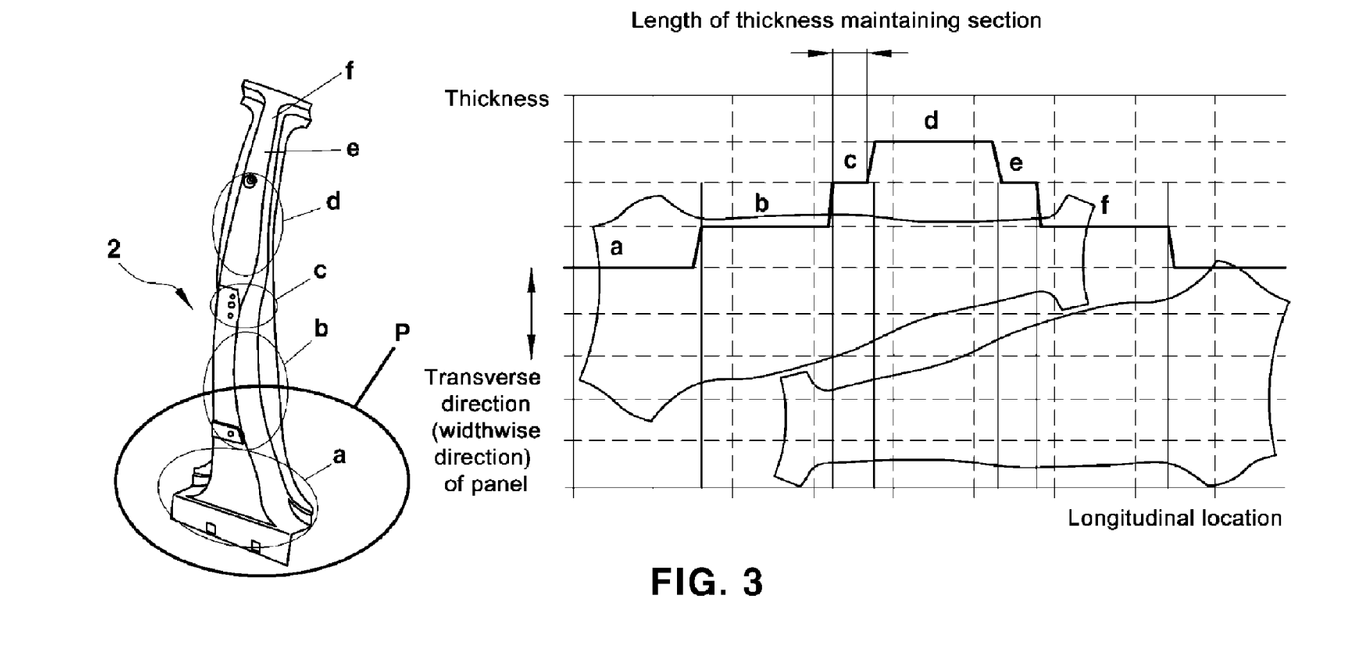
FIG. 3 is a view showing a longitudinal thickness change in an outer panel of a center pillar manufactured through a TRB method according to the related art.

FIG. 3 is a view showing a thickness change of a cross-section taken along line A-A of FIG. 2, and shows that the thickness of a panel 2 is varied (graded) according to locations of the panel 2 along a lengthwise direction thereof when the TRB method is applied.

Referring to FIG. 3, a thickness of a vertically intermediate portion (portion 'c') of the panel 2 to which a door supporting force is applied is made large to locally reinforce the panel 2, and a thickness of a portion (portion 'd') where a reinforcing panel is located is made larger on the upper side of portion 'c'.

Figure 4:
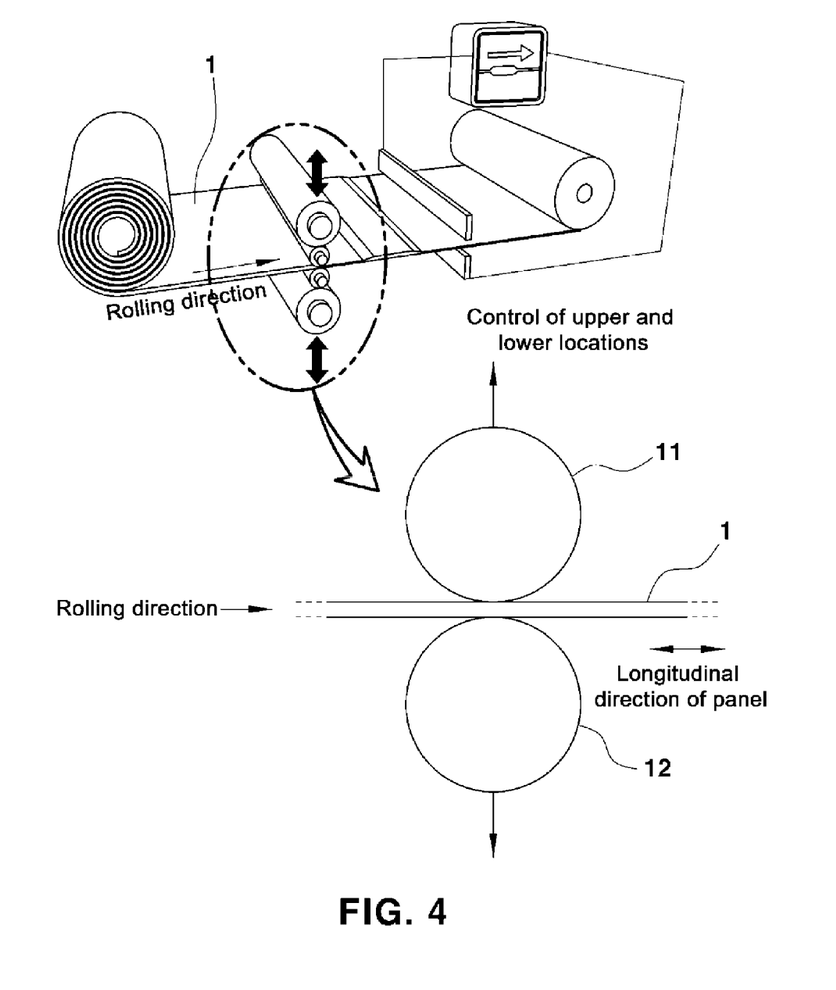
FIG. 4 is a view showing a conventional rolling apparatus to which a TRB method is applied.

FIG. 4 is a view showing a rolling apparatus to which the TRB method is applied. In order to manufacture an outer panel having a variable thickness structure, a steel plate 1 that is a panel material passes between upper and lower rolling rollers 11 and 12 to perform TRB rolling to grade a thickness of the steel plate, and an outer panel having a desired shape is finished through a press process including drawing and trimming and a succeeding process such as hole processing.

Here, the TRB rolling process, a thickness of the rolled steel plate 1 is varied by controlling vertical locations of the two upper and lower rolling rollers 11 and 12.

However, since a panel manufactured through the TRB method has a thickness difference along a longitudinal direction (heightwise direction) of the panel, it may be fractured and may cope with absorption of collision energy only in a longitudinal direction thereof.

Figure 5:
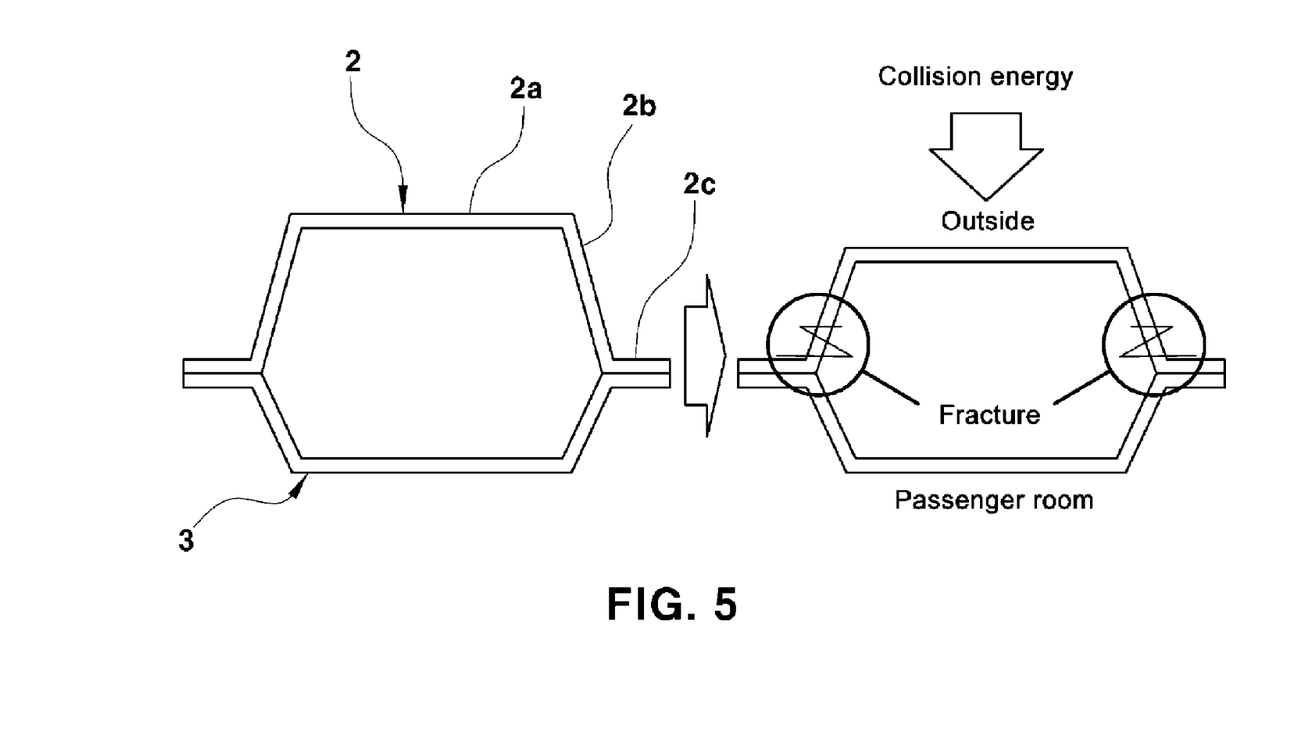
FIG. 5 is a sectional view for explain a problem of a center pillar to which a TRB panel is applied according to the related art.

As shown in FIG. 5, in the center pillar according to the related art, opposite side surfaces 2b of an outer panel 2 may be fractured or a welding point of a flange 2c may be fractured due to strong collision energy in a cross-section where the outer panel 2 and an inner panel 3 are bonded to each other during a side collision thereof.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a pillar panel that can improve energy absorption efficiency during collision, and an apparatus and a method for manufacturing the same.

Various aspects of the present invention provide for an outer panel for a pillar of a vehicle having a central portion, flanges at opposite sides thereof for bonding to an inner panel, and opposite side portions between the central portion and the flange portions in a transverse sectional shape, wherein each of the side portions located at opposite sides of the central portion has a collision energy absorbing section having a thickness that is smaller than that of the central portion.

Various aspects of the present invention provide for a rolling apparatus for generating a thickness difference by tailor rolled blank (TRB) rolling a steel plate that is a material of an outer panel to manufacture the outer panel having a collision energy absorbing section in which side portions located at opposite sides of a central portion have reduced thicknesses as compared with the central portion, wherein two rollers are disposed lengthily in a direction parallel to a lengthwise direction of the outer panel manufactured of the steel plate such that the steel plate passes between the two rolling rollers by making a widthwise direction of the steel plate passing through the upper rolling roller and the lower rolling roller the same as a lengthwise direction of the outer panel, and one of the upper rolling roller and the lower rolling roller is a roller having a sectional shape in which a protrusion is formed at one side of a circular cross-section.

Various aspects of the present invention provide for a method of manufacturing an outer panel in which side portions located at opposite sides of a central portion have collision energy absorbing sections in which thicknesses thereof are smaller than a thickness of the central portion, the method including: a rolling step of TRB rolling a steel plate that is a material of the outer panel to generate a thickness change of the steel plate along a rolling direction; and a processing step of pressing and cutting the steel plate having undergone the rolling step to produce a shape of the outer panel, wherein in the rolling step, a thickness difference of parts of the steel plate that are to become a central portion and side portions along the rolling direction by passing the steel plate between the two rolling rollers such that a widthwise direction of the steel plate passing between the upper rolling roller and the lower rolling roller is the same as a lengthwise direction of the outer panel.

Since a variable widthwise (transverse) thickness structure is manufactured to produce an energy absorption zone in a panel, a pillar and a vehicle body structure by which energy absorption performance may be improved during collision of a pillar and a damage to a passenger can be reduced can be constituted.

In particular, since a thickness reduced part of a side surface of an outer panel absorbs energy before the outer panel is fractured, it is more advantageous in an aspect of a survival space of a passenger.

The present methods and apparatuses have other features and advantages apparent from the accompanying drawings, incorporated herein, and below Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a pillar panel for a vehicle, and more particularly to an outer panel for a center pillar that can improve energy absorption efficiency during collision of a vehicle.

Further, the present invention relates to an apparatus and a method for manufacturing a pillar panel for a vehicle, and more particularly to a rolling apparatus and a rolling method for manufacturing an outer panel having an improved variable thickness structure by using a tailor rolled blank (TRB) method.

Hereinafter, in the specification, a longitudinal direction of a panel refers to a lengthwise direction of a panel, that is, a heightwise direction (a direction taken along line A-A of FIG. 2) of a panel with respect to a direction of a vehicle body while the vehicle body is assembled.

Further, a transverse direction of the panel refers to a direction substantially perpendicular to the longitudinal direction, and refers to a forward/rearward widthwise direction (a direction taken along line B-B of FIG. 2) with respect to a direction of the vehicle body while the vehicle body is assembled.

Figure 6:
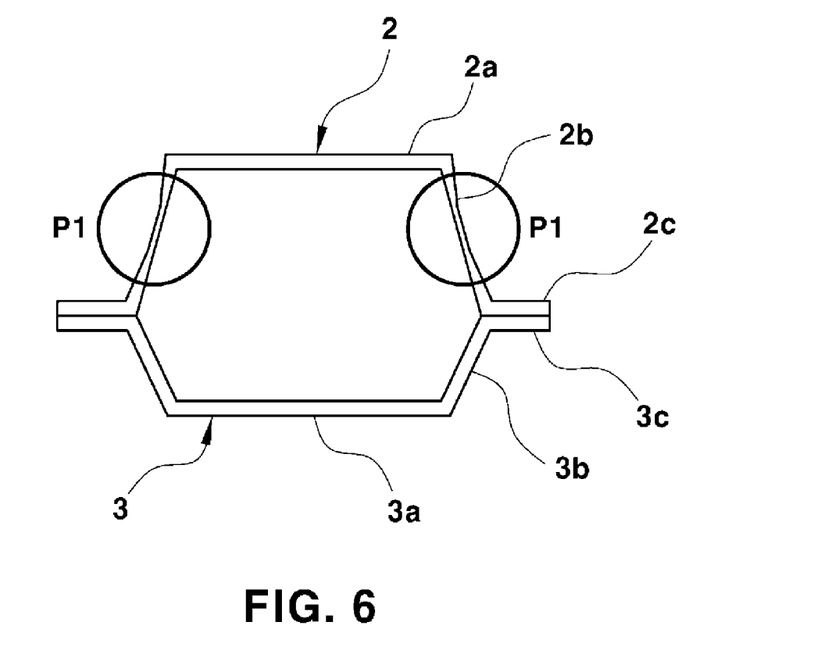
FIG. 6 is a sectional view schematically showing an exemplary center pillar to which an outer panel according to the present invention is applied.

Hereinafter, various embodiments of the present invention will be described with reference to the accompanying drawings. FIG. 6 is a sectional view of a center pillar formed by using an outer panel according to various embodiments of the present invention.

First, in the outer panel 2 for a center pillar of the present invention, an energy absorption zone P1 that can improve collision performance of a panel by applying a variable transverse thickness shape having graded thicknesses along a transverse direction is produced to solve a conventional problem of having variable longitudinal thickness shape (a shape in which thicknesses are graded according to a longitudinal direction of the panel).

FIG. 6 shows a sectional shape obtained by transversely cutting away a center pillar to which the outer panel 2 according to various embodiments of the present invention is applied, and an integral center pillar is formed by assembling the outer panel 2 and an inner panel 3.

The outer panel 2 and the inner panel 3 are assembled to form a closed sectional structure, and flanges 2c and 3c formed along opposite side ends of the panels 2 and 3 are welded to each other.

Transverse sectional shapes of the outer panel 2 and the inner panel 3 may include central portions 2a and 3a, flanges 2c and 3c at opposite ends thereof, and side portions 2b and 3b between the central portions 2a and 3a and the flanges 2c and 3c.

The outer panel 2 of the present invention has a sectional shape whose thickness is varied according to a transverse direction thereof, and in various embodiments of the present invention, the outer panel 2 has a shape in which a thickness of the side portion 2b is locally reduced with respect to a transverse sectional shape to produce an energy absorption zone P1 in the panel.

That is, a variable thickness section is formed in the side portion 1b to gradually decrease and then increase again. The locally decreased thickness section provides a section for absorbing collision energy before fracture, that is, an energy absorbing zone P1.

If a variable thickness section is provided in the outer panel 2 to directly install an energy absorbing zone P1 in the center pillar, the variable thickness section of the side portion 2b absorbs collision energy to prevent fracture when the collision energy generated due to a side collision is applied to the central portion 2a.

Meanwhile, in order to vary a thickness of the panel 2 along the transverse direction, in particular, in order to locally reduce a thickness of the side portion 2b in the narrow area of the side portion 2b, an improved TRB technology and an improved rolling apparatus to which the TRB technology can be applied are required.

In the conventional TRB rolling apparatus shown in FIG. 4, since a thickness of a panel is varied through adjustment of vertical locations of two rollers while the two upper and lower rollers 11 and 12 roll a steel plate 1, a minimum length of a section (a thickness maintaining section) where there does not exist a thickness change in the panel in the stepped thickness profile shown in FIG. 3.

For example, in the conventional TRB method, there is a limit (for example, a length of section 'c' is limited to about 50 mm) by which a length of section of FIG. 3 is limited, and a length smaller than 50 mm cannot realized by the rolling apparatus of FIG. 4.

Accordingly, in the TRB rolling process, as compared with a conventional rolling method in which a steel plate that is a panel material passes between upper and lower rolling rollers disposed lengthily in a direction parallel to a transverse direction (widthwise direction) of an outer panel, the present invention increases a length of rolling rollers such that a steel plate passes between upper and lower rollers disposed lengthily in a direction parallel to a lengthwise direction (longitudinal direction) of an outer panel.

That is, the present invention and the conventional rolling apparatus according to the known TRB method are common in that vertical locations of upper and lower rolling rollers of the rolling apparatuses are adjusted, but a length of the rolling rollers are increased so that a steel plate are rolled such that a widthwise direction (a direction perpendicular to a rolling direction) of the steel plate passing between two rolling rollers is the same as a lengthwise direction of an outer panel.

Figure 7:
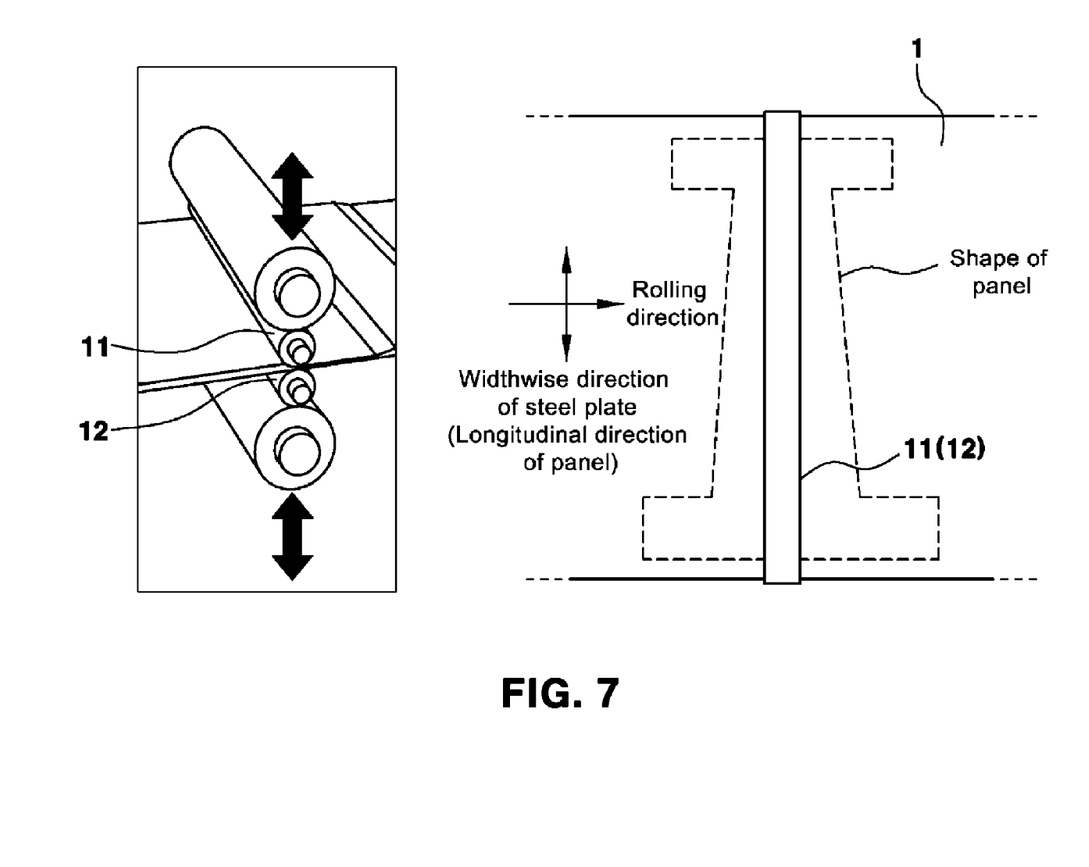
FIG. 7 is a view showing a lengthwise direction and a rolling direction of an exemplary rolling roller, and a lengthwise direction of an exemplary outer panel of the present invention.
Figure 8:
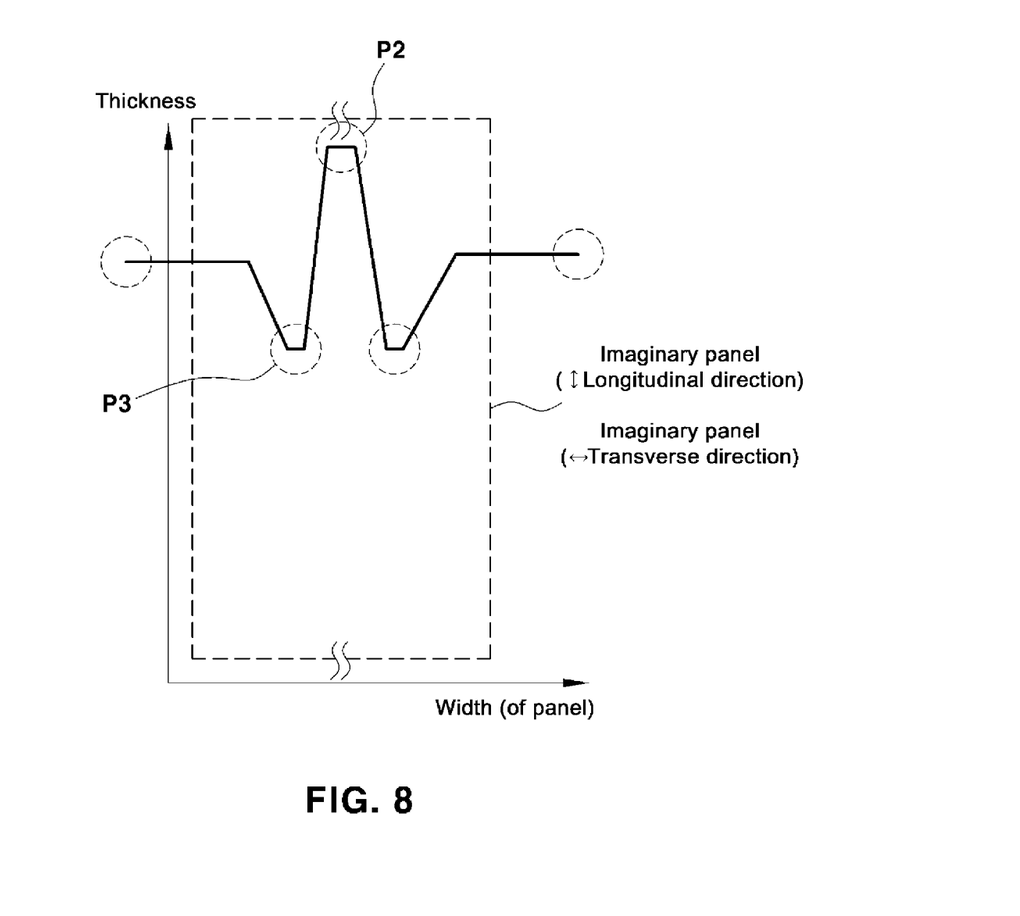
FIG. 8 is a view showing a thickness change of a cross-section of the exemplary outer panel of the present invention.

FIG. 7 is a view showing a relationship between a lengthwise direction of rolling rollers 11 and 12, a roller passing direction (rolling direction) of the steel plate 1 during a rolling process, and a lengthwise direction (longitudinal direction) of an outer panel (blank), and FIG. 8 is a view showing a thickness change of a transverse section of the outer panel of the present invention.

In the drawings, a shape of a blank of an outer panel is simplified to help understanding.

As shown, the steel plate 1 passes between the rolling rollers 11 and 12 such that a lengthwise direction (longitudinal direction) of the outer panel, that will be manufactured, is substantially the same as a lengthwise direction of the rolling rollers 11 and 12 in consideration of a part of the roller steel plate that is to be processed to the outer panel.

That is, a direction in which the steel plate 1 passes between the rolling rollers 11 and 12, that is, a rolling direction (a direction perpendicular to a lengthwise direction of the rollers) becomes a transverse direction (widthwise direction) of the outer panel.

Further, the thickest part of the stepped variable thickness section may be located at a central part (2a of FIG. 6) of the outer panel, and this is because the central portion 2a can directly contact a collision object in a column in which an upper end of the outer panel overlaps a roof rail of the vehicle body and a lower end thereof is connected to a side sill outer panel.

Thus, a thickness of the central portion 2a of the outer panel is made thick and thicknesses of the opposite side portions 2b is reduced with respect to the central portion 2a (see FIG. 6), a thickness maintaining section (portion P2 of FIG. 8) having a predetermined width (a predetermined length with respect to the steel plate) in cross-section of the panel is set in the thickest portion of the central portion 2a, and a variable thickness section in which thicknesses of portions of the steel plate that are side portions of the opposite side portions decrease and then increase again is set (see FIG. 8).

A thickness maintaining section (portion P2 of FIG. 8) having a predetermined width in a section of the panel is also set at the thinnest portion of the side portion 2b, and the thickness of the panel increases from the thinnest portion of the side portion to the flange 2c toward a side of the panel (see FIG. 8).

Then, a width of the thickness maintaining section P2 of the central portion is set to be larger than a width of the thickness maintaining section P3.

A thickness of the flange 2c is set to be smaller than the maximum thickness of the central portion such that it is within a set ratio with respect to the maximum thickness, and this is because the flange is bonded to an inner panel of the center pillar to maintain collision strength.

As a result, the thickness change profile corresponds to a W-shaped thickness change profile instead of a general stepped profile of the TRB of FIG. 3, and the present invention produces an energy absorbing zone (portion P1 of FIG. 6) by applying a W-TRB technology that is a technology of rolling a plate such that the plate has a W-shaped variable thickness structure.

Since the thickness maintaining section has a small section length and the general rolling apparatus of FIG. 4 has a limit (a minimum of 50 mm) in the length of the maintaining section after a variation of the thickness thereof, it is impossible to realize the W-shaped variable thickness structure of FIG. 8 when the rolling apparatus is directly used.

Thus, the rolling apparatus of the present invention uses asymmetric upper and lower rolling rollers to realize W-TRB rolling for forming a small thickness maintaining section in the steel plate.

Figure 9:
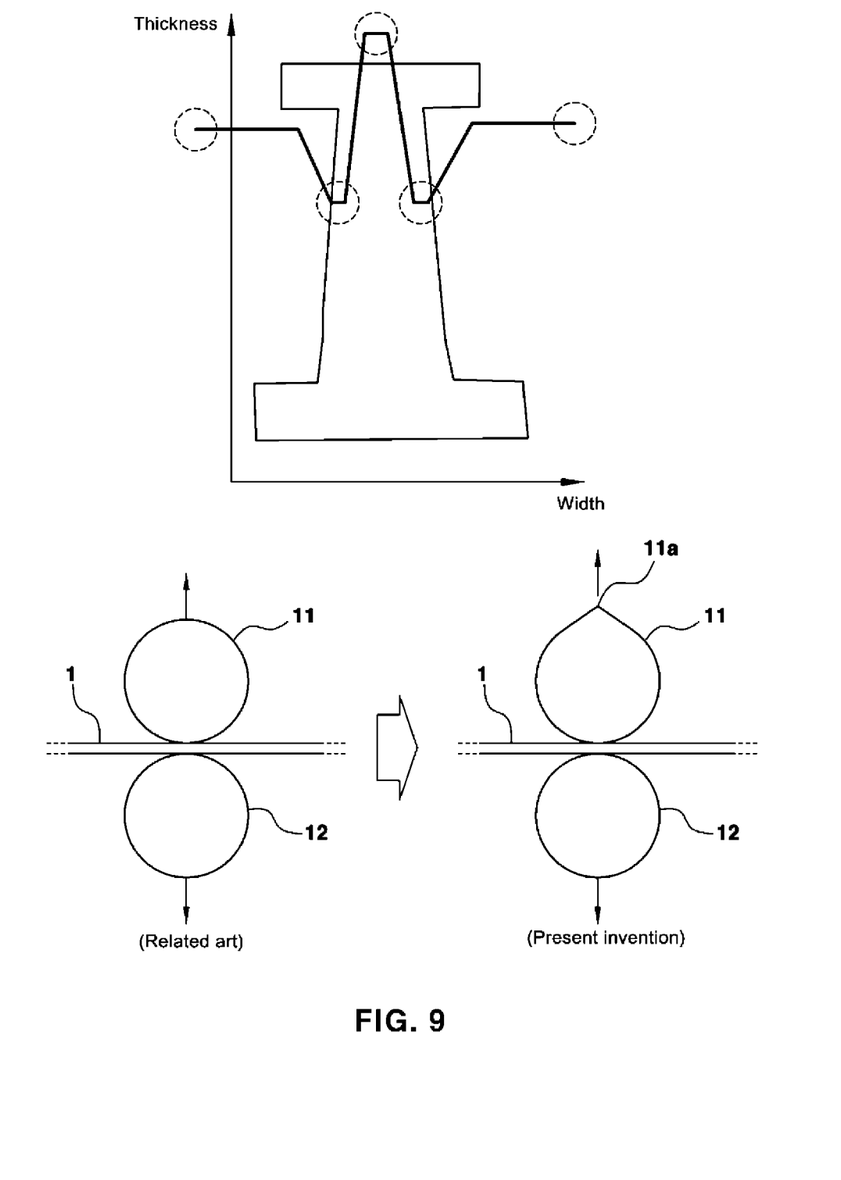
FIG. 9 is a view showing an exemplary rolling apparatus to which an asymmetric roller is applied according to the present invention.

FIG. 9 is a view showing a rolling apparatus to which asymmetric rollers are applied. As exemplified, a general roller 12 having a circular cross-section is used as one of the two upper and lower rollers, and a roller 11 having a cross-section in which a protrusion 11*a* is formed at one side of the circular cross-section is used as the other roller.

FIG. 9 shows an exemplary roller 11 having the protrusion 11*a* is applied to the upper roller.

In the rolling apparatus to which the asymmetric roller is applied, the energy absorbing zone (portion P1 of FIG. 6) proposed by the present invention may be formed through adjustment of vertical locations of the upper rolling roller 11 and the lower rolling roller 12 and various variable thickness structure having a W shape obtained by reducing the thickness maintaining section may be formed in the panel.

The steel plate in which a difference in thickness generated during the rolling process is finished as an outer panel having a desired shape via a press process including drawing and trimming, and a succeeding process such as a hole processing.

The drawing process is a process for pressing a shape of the outer panel, and the trimming process is a process of cutting and separating the formed panel such that the formed panel corresponds to the shape of the outer panel.

Figure 10:
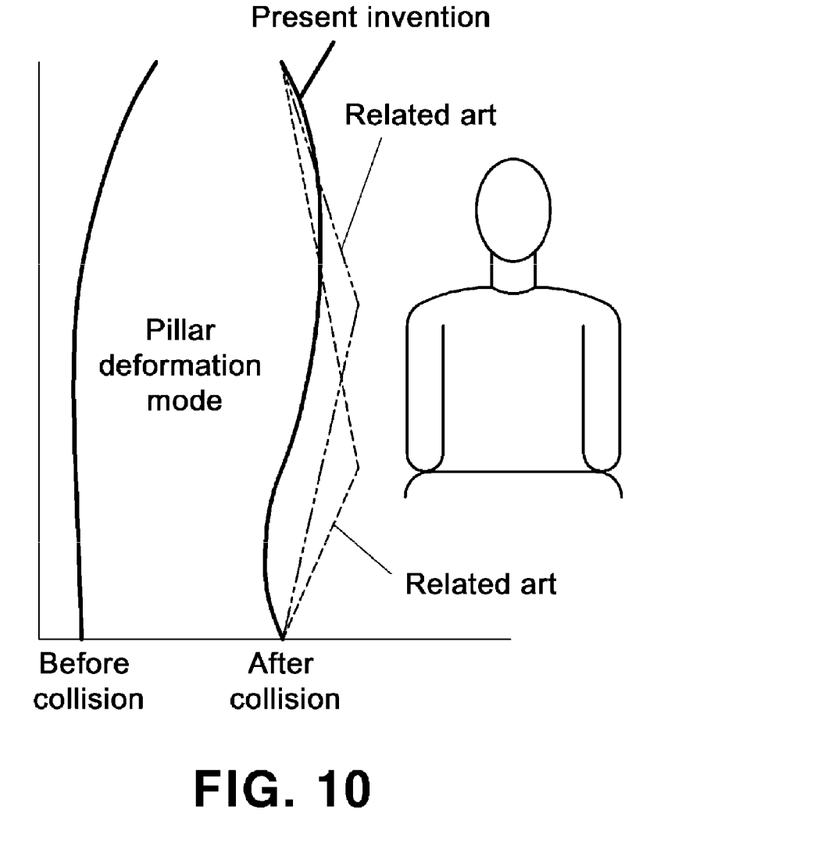
FIG. 10 is a view showing deformation modes of center pillars when the outer panels according to the present invention and according to the related art are applied.

FIG. 10 is a view showing deformation modes of center pillars when the outer panels according to the present invention and according to the related art are applied. Although a survival space for a passenger is significantly reduced due to fractures of upper and lower portions of the outer panel when the conventional outer panel is applied, an energy absorbing operation is performed before a thickness reducing portion of the side portion is fractured when the outer panel of the present invention is applied, which is more advantageous in an aspect of the survival space for a passenger.

Accordingly, when the outer pillar of the present invention is applied, a side collision performance of the center pillar can be improved. Further, the present invention is advantageous in an aspect of collision safety by which an injury degree of the passenger can be reduced.

For convenience in explanation and accurate definition in the appended claims, the terms upper or lower, forward or rearward, and etc., are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An outer panel for a pillar of a vehicle, comprising:
   an inner panel;
   a central portion including flanges at opposite sides thereof for bonding to the inner panel, and including opposite side portions between the central portion and the flanges in a transverse sectional shape;
   wherein each of the side portions located at opposite sides of the central portion has a collision energy absorbing section having a thickness that is smaller than that of the central portion, and
   wherein an outer surface of the side portions of the collision energy absorbing section includes a reentrant shape curved towards an inner surface of the side portions.

2. The outer panel of claim 1, wherein the side portion has a collision energy absorbing section in which a thickness thereof gradually decreases and then increases again.

3. The outer panel of claim 1, wherein a thickest portion in the transverse sectional shape is formed at the central portion, and the thickness of the outer panel gradually decreases from the thickest portion to opposite sides such that thinnest portions are formed in the side portions.

4. The outer panel of claim 3, wherein sectional thicknesses of the outer panel gradually increase as they go from the thinnest portions to the flanges, and thicknesses of the flanges are set to be small to be within a set ratio as compared the thickest thickness of the central portion.

5. The outer panel of claim 3, wherein the thickest portion of the central portion and the thinnest portions of the side portions have thickness maintaining sections having the same thicknesses.

\* \* \* \* \*